(12) United States Patent
Yuan

(10) Patent No.: US 10,587,741 B2
(45) Date of Patent: Mar. 10, 2020

(54) COMMUNICATION EVENT PROCESSING METHOD AND APPARATUS

(71) Applicant: Tencent Technology (Shenzhen) Company Limited, Shenzhen (CN)

(72) Inventor: Cancai Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/625,694

(22) Filed: Jun. 16, 2017

(65) Prior Publication Data

US 2017/0353593 A1    Dec. 7, 2017

Related U.S. Application Data

(63) Continuation of application No. PCT/CN2016/078998, filed on Apr. 11, 2016.

(30) Foreign Application Priority Data

May 22, 2015    (CN) .......................... 2015 1 0266162

(51) Int. Cl.
*H04M 1/663* (2006.01)
*H04M 3/42* (2006.01)
(Continued)

(52) U.S. Cl.
CPC ....... *H04M 1/663* (2013.01); *H04M 3/42178* (2013.01); *H04M 3/436* (2013.01);
(Continued)

(58) Field of Classification Search
CPC ........ H04M 3/436; H04M 1/663; H04W 4/16
See application file for complete search history.

(56) References Cited

U.S. PATENT DOCUMENTS 6,078,581 A    6/2000  Shtivelman et al.
6,421,439 B1 *  7/2002  Liffick ................. G06F 9/542
                                             379/201.02
(Continued)

FOREIGN PATENT DOCUMENTS

CN    102413169 A    4/2012
CN    102611805 A    7/2012
(Continued)

OTHER PUBLICATIONS

Tencent Technology, ISRWO, PCT/CN2016/078998, dated Jun. 22, 2016, 8 pgs.
(Continued)

*Primary Examiner* — Matthew C Sams
(74) *Attorney, Agent, or Firm* — Morgan, Lewis & Bockius LLP

(57) ABSTRACT

A communication event processing method performed at a computer server includes: obtaining identification information and call description information from multiple different terminals about a phone number; determining whether the phone number is a nuisance phone number according to the call description information and a quantity of the terminals identifying the phone number; and sending, after receiving a query request for the phone number, a blocking instruction to a terminal initiating the query when it is determined that the phone number is a nuisance phone number, so that the terminal initiating the query blocks a communication event of the phone number. According to the present disclosure, the server can determine which phone numbers are nuisance phone numbers according to specific identification cases and the call description information, and therefore provide highly accurate processing in response to a query request of a terminal, thereby greatly improving efficiency of communication event processing.

15 Claims, 5 Drawing Sheets

(51) Int. Cl.
*H04M 3/436* (2006.01)
*H04W 4/16* (2009.01)

(52) U.S. Cl.
CPC .......... *H04W 4/16* (2013.01); *H04M 3/42059* (2013.01); *H04M 2203/551* (2013.01); *H04M 2203/556* (2013.01)

(56) References Cited

U.S. PATENT DOCUMENTS

| | | | | |
|---|---|---|---|---|
| 8,094,800 | B1* | 1/2012 | Smith | H04M 3/436 379/210.02 |
| 8,443,049 | B1* | 5/2013 | Geddes | H04L 63/126 709/205 |
| 8,577,002 | B2* | 11/2013 | Stein | H04L 65/1079 379/142.06 |
| 8,626,137 | B1* | 1/2014 | Devitt | H04M 3/42042 455/414.3 |
| 9,100,476 | B1* | 8/2015 | Devitt | H04M 3/42042 |
| 9,544,431 | B2* | 1/2017 | Zhang | H04M 3/42059 |
| 9,716,796 | B2* | 7/2017 | Cinar | H04L 67/34 |
| 9,774,731 | B1* | 9/2017 | Haltom | H04M 3/4365 |
| 2004/0264663 | A1* | 12/2004 | Enzmann | H04M 1/57 379/142.06 |
| 2007/0201660 | A1* | 8/2007 | Lan | H04M 3/436 379/201.01 |
| 2007/0283006 | A1* | 12/2007 | Hong | H04M 3/436 709/224 |
| 2009/0103701 | A1* | 4/2009 | Garg | H04M 3/436 379/142.04 |
| 2010/0138282 | A1* | 6/2010 | Kannan | G06Q 10/06398 705/7.42 |
| 2011/0170680 | A1* | 7/2011 | Chislett | H04M 3/436 379/142.06 |
| 2011/0219455 | A1* | 9/2011 | Bhagwan | G06F 21/00 726/26 |
| 2011/0294478 | A1* | 12/2011 | Trivi | H04M 3/436 455/415 |
| 2012/0128144 | A1* | 5/2012 | Chislett | H04M 3/436 379/201.01 |
| 2012/0240236 | A1* | 9/2012 | Wyatt | G06F 21/564 726/25 |
| 2012/0309365 | A1* | 12/2012 | Wang | H04M 3/436 455/414.1 |
| 2013/0102286 | A1* | 4/2013 | Toksvig | H04W 4/12 455/412.2 |
| 2013/0339091 | A1* | 12/2013 | Humay | G06Q 30/0203 705/7.32 |
| 2014/0128047 | A1* | 5/2014 | Edwards | H04L 51/12 455/415 |
| 2015/0288649 | A1* | 10/2015 | Kim | H04L 61/1594 455/414.1 |
| 2016/0055563 | A1* | 2/2016 | Grandhi | G06Q 30/0625 705/26.62 |
| 2016/0065712 | A1* | 3/2016 | Zhekov | H04M 1/663 455/567 |
| 2016/0142540 | A1* | 5/2016 | Hickey | H04M 3/436 379/210.02 |
| 2016/0232563 | A1* | 8/2016 | Perez | H04L 67/306 |

FOREIGN PATENT DOCUMENTS

| | | |
|---|---|---|
| CN | 102811202 A | 12/2012 |
| CN | 103037062 A | 4/2013 |
| CN | 104038648 A | 9/2014 |
| CN | 104066065 A | 9/2014 |
| CN | 104253908 A | 12/2014 |
| CN | 104320525 A | 1/2015 |
| CN | 104378480 A | 2/2015 |

OTHER PUBLICATIONS

Tencent Technology, IPRP, PCT/CN2016/078998, dated Nov. 28, 2017, 7 pgs.

* cited by examiner

COMMUNICATION EVENT PROCESSING METHOD AND APPARATUS

PRIORITY CLAIM AND RELATED APPLICATION

This application is a continuation application of PCT Patent Application No. PCT/CN2016/078998, entitled "COMMUNICATION EVENT PROCESSING METHOD AND APPARATUS" filed on Apr. 11, 2016, which claims priority to Chinese Patent Application No. 201510266162.4, entitled "COMMUNICATION EVENT PROCESSING METHOD AND APPARATUS" filed on May 22, 2015, both of which are incorporated by reference in their entirety.

FIELD OF THE TECHNOLOGY

The present disclosure relates to the field of terminal technologies, and in particular, to a communication event processing method and apparatus.

BACKGROUND OF THE DISCLOSURE

With rapid development of communications tools such as mobile phones, people become increasingly dependent on mobile phones. However, as people use mobile phones, some troubles appear. Some users for commercial purposes or malicious purposes such as fraud may frequently harass other users by calling or sending SMS messages, causing inconvenience to the other users' life and possibly property damage.

To avoid such bad effects, users may set a blacklist on their mobile phones. When a communication event such as an incoming call or an SMS message occurs, blocking processing may be performed according to the set blacklist. In this way, an objective of blocking a communication event of a user in the blacklist may be achieved. Certainly, the users may also report some nuisance phone numbers by using some applications such as Phone Manager, so that a server stores these nuisance phone numbers, and subsequently reminds other users to block incoming calls from these nuisance phone numbers.

However, the manner of setting a blacklist by a user causes some limitations. A mobile phone may block communication events of only users that are in a blacklist. For some phone numbers not stored in the blacklist, blocking processing is not performed. Therefore, efficiency of communication event processing in this manner is relatively low. In addition, the form of reporting to a server may easily cause incorrect blocking, affecting normal communication of a user.

SUMMARY

To resolve the problem in the existing technology, embodiments of the present invention provide a communication event processing method and apparatus. The technical solutions are as follows:

According to an aspect, a communication event processing method is provided, including:

obtaining identification information and call description information from multiple different terminals about a phone number;

determining whether the phone number is a nuisance phone number according to the call description information and a quantity of the terminals identifying the phone number; and sending, after receiving a query request for the phone number, a blocking instruction to a terminal initiating the query when it is determined that the phone number is a nuisance phone number, so that the terminal initiating the query blocks a communication event of the phone number.

According to another aspect, a communication event processing apparatus is provided, including:

an obtaining module, configured to obtain identification information and call description information from multiple different terminals about a phone number;

a determining module, configured to determine whether the phone number is a nuisance phone number according to the call description information and a quantity of the terminals identifying the phone number; and a sending module, configured to send, after receiving a query request for the phone number, a blocking instruction to a terminal initiating the query if the determining module determines that the phone number is a nuisance phone number, so that the terminal initiating the query blocks a communication event of the phone number.

Beneficial effects brought by the technical solutions provided in the embodiments of the present invention are: A server collects identification information and call description information of terminals about phone numbers, so that the server can determine which phone numbers are nuisance phone numbers according to specific identification cases and the call description information, and can therefore provide highly accurate processing in response to a query request of a terminal, thereby greatly improving efficiency of communication event processing.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present invention in detail with reference to the accompanying drawings.

Figure 1:
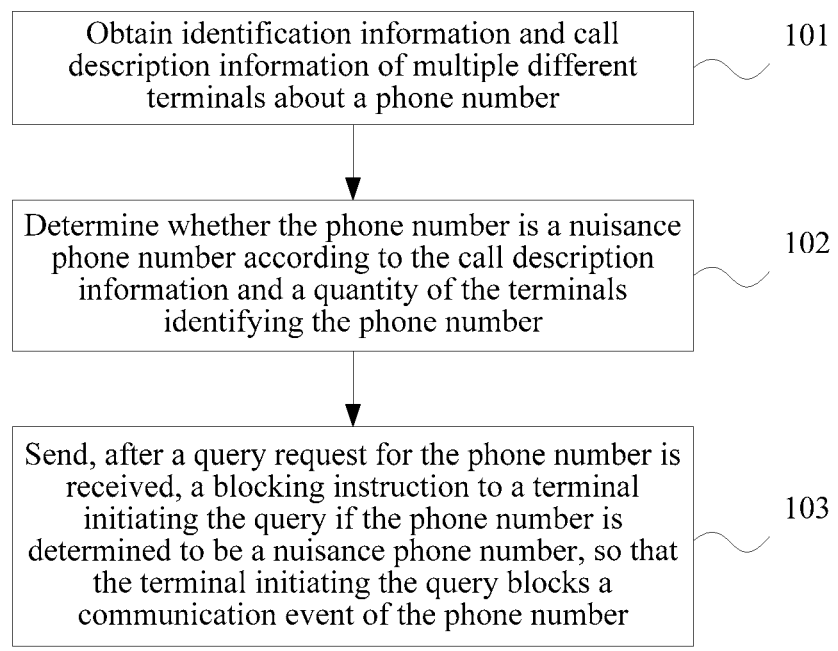
FIG. 1 is a flowchart of a communication event processing method according to an embodiment of the present invention.

FIG. 1 is a flowchart of a communication event processing method according to an embodiment of the present invention. The method may be applied to a server. Referring to FIG. 1, the communication event processing method includes:

101: Obtain identification information and call description information from multiple different terminals about a phone number.

102: Determine whether the phone number is a nuisance phone number according to the call description information and a quantity of the terminals identifying the phone number.

103: Send, after receiving a query request for the phone number, a blocking instruction to a terminal initiating the query when it is determined that the phone number is a nuisance phone number, so that the terminal initiating the query blocks a communication event of the phone number.

In this embodiment of the present invention, the blocking processing may refer to dropping an incoming call, or not prompting for an incoming call, or prompting for an incoming call according to the number identification information after dropping, so that a user knows an effect of the blocking processing.

Optionally, the operation of determining whether the phone number is a nuisance phone number according to the call description information and a quantity of the terminals identifying the phone number includes:

determining a call frequency of the phone number according to call occurring times between the multiple terminals and the phone number; and determining that the phone number is a nuisance phone number when the call frequency of the phone number is greater than a first preset threshold, and the quantity of the terminals identifying the phone number is greater than a second preset threshold.

Optionally, the operation of determining whether the phone number is a nuisance phone number according to the call description information and a quantity of the terminals identifying the phone number includes:

determining an average call duration of the phone number according to call durations between the multiple terminals and the phone number; and determining that the phone number is a nuisance phone number if the average call duration of the phone number is greater than a third preset threshold, and the quantity of the terminals identifying the phone number is greater than a second preset threshold.

Optionally, the operation of determining whether the phone number is a nuisance phone number according to the call description information and a quantity of the terminals identifying the phone number includes:

determining a call-occurring-region overlapping rate of the phone number according to call occurring regions between the multiple terminals and the phone number; and determining that the phone number is a nuisance phone number when the call-occurring-region overlapping rate of the phone number is greater than a fourth preset threshold, and the quantity of the terminals identifying the phone number is greater than a second preset threshold.

Optionally, the operation of obtaining identification information and call description information from multiple different terminals about a phone number includes:

extracting the identification information and the call description information from the multiple different terminals about the phone number from user report information of a specified application; and/or extracting the identification information and the call description information from the multiple different terminals about the phone number from user report information of an application except the specified application; and/or extracting the identification information and the call description information from the multiple different terminals about the phone number from comment information of network users by using a web crawler.

The foregoing optional technical solutions can form an optional embodiment of the present invention according to any combination, and details are not described herein.

Figure 2:
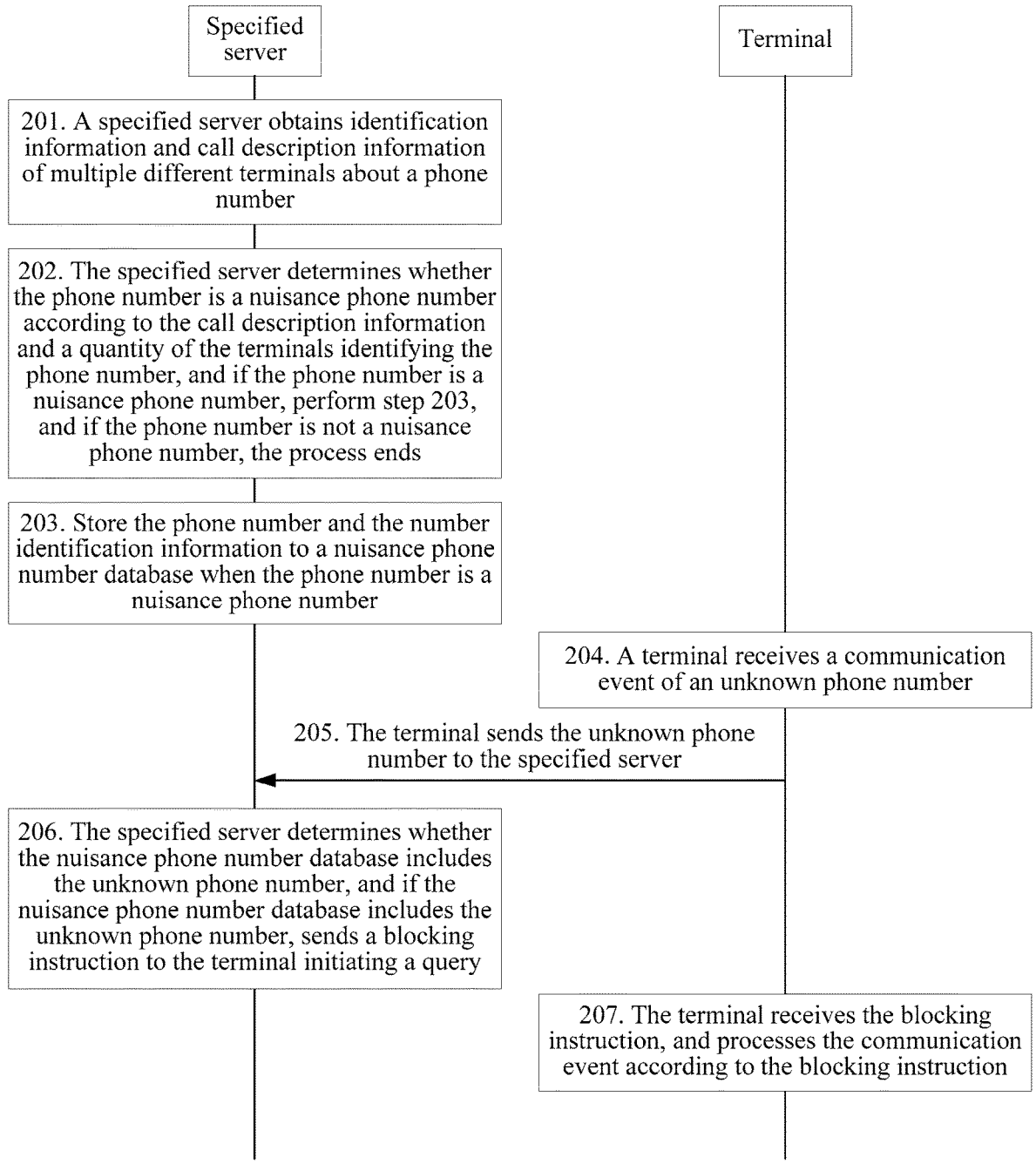
FIG. 2 is a flowchart of another communication event processing method according to an embodiment of the present invention.

FIG. 2 is a flowchart of a communication event processing method according to an embodiment of the present invention. Referring to FIG. 2, the communication event processing method includes:

201: A specified server obtains identification information and call description information from multiple different terminals about a phone number.

The specified server may be a server configured to store nuisance phone numbers and corresponding number identification information. A user may send a nuisance phone number learned in an actual use process to the specified server after registering a service of the specified server.

The call description information refers to information such as call occurring times, call durations, and call occurring regions between the multiple terminals and the phone number. It can be known through analysis that a nuisance phone number has a particular nuisance regularity. For example, call occurring times are relatively concentrated, and a call is quickly dialed after a previous call is over; call durations are relatively short in general; or the call occurring regions are relatively concentrated. Certainly, a nuisance phone number may dials based on a phone number segment. Therefore, number segments of phone numbers of the multiple terminals may also be analyzed, so as to determine whether the phone number is a nuisance phone number.

Specifically, the operation of obtaining identification information and call description information from multiple different terminals about a phone number may include at least one of the following obtaining manners: (1) extracting the identification information and the call description information from the multiple different terminals about the phone number from user report information of a specified application; (2) extracting the identification information and the call description information from the multiple different terminals about the phone number from user report information of an application except the specified application; or (3) extracting the identification information and the call description information from the multiple different terminals about the phone number from comment information of network users by using a web crawler. The specified application may be a blocking application, a phone management application, or the like provided by the specified server. The application except the specified application may be an application having a cooperation relationship with the current specified server.

The identification information of the terminals about the phone number may indicate a property of the phone number, such as a nuisance call, advertising, merchandising, or fraud.

202: The specified server determines whether the phone number is a nuisance phone number according to the call description information and a quantity of the terminals identifying the phone number, and if the phone number is a nuisance phone number, perform step 203, and if the phone number is not a nuisance phone number, the process ends.

For each phone number, a quantity of terminals identifying the phone number may be determined according to a quantity of pieces of identification information, of the phone number, received by the specified server. Certainly, for two times of report of a same terminal about a same phone number, regardless of whether identification information added during the two times of report is the same, a quantity of the terminal may be counted as 1 or 2.

Specifically, the operation of determining whether the phone number is a nuisance phone number according to the call description information and a quantity of the terminals identifying the phone number includes at least one of the following manners:

First manner: Call frequency of the phone number is determined according to call occurring times between the multiple terminals and the phone number, and it is determined that the phone number is a nuisance phone number when the call frequency of the phone number is greater than a first preset threshold, and the quantity of the terminals identifying the phone number is greater than a second preset threshold.

In the first manner, for a phone number, excessively high call frequency may indicate that the phone number is a nuisance phone number. Therefore, the call frequency of the phone number may be determined according to the call occurring times between the phone number and the multiple terminals. For example, when the call frequency of the phone number exceeds 300 times within one day, the phone number is a nuisance phone number, and the phone number and the identification information of the phone number are stored to a nuisance phone number database.

Second manner: An average call duration of the phone number is determined according to call durations between the multiple terminals and the phone number, and it is determined that the phone number is a nuisance phone number if the average call duration of the phone number is greater than a third preset threshold, and the quantity of the terminals identifying the phone number is greater than a second preset threshold.

In the second manner, for a nuisance phone number, a call duration is generally very short. Therefore, the average call duration of the phone number may be determined according to the call durations between the phone number and the multiple terminals. For example, if the average call duration of the phone number is 15 seconds, the phone number is a nuisance phone number, and the phone number and the identification information of the phone number are stored to a nuisance phone number database.

Third manner: A call-occurring-region overlapping rate of the phone number is determined according to call occurring regions between the multiple terminals and the phone number, and it is determined that the phone number is a nuisance phone number when the call-occurring-region overlapping rate of the phone number is greater than a fourth preset threshold, and the quantity of the terminals identifying the phone number is greater than a second preset threshold.

In the third manner, for a nuisance phone number, call occurring regions are relatively concentrated in general. Therefore, the call-occurring-region overlapping rate of the phone number may be determined according to the call occurring regions between the phone number and the multiple terminals. For example, if the call-occurring-region overlapping rate of the phone number is 80%, the phone number is a nuisance phone number, and the phone number and the identification information of the phone number are stored to a nuisance phone number database.

Certainly, a nuisance phone number may be determined by using at least one of the foregoing three manners, or by using a combination of multiple manners in the foregoing three manners. For example, call frequency of the phone number is determined according to call occurring times between the multiple terminals and the phone numbers, an average call duration of the phone number is determined according to call durations between the multiple terminals and the phone number, and it is determined that the phone number is a nuisance phone number when the call frequency of the phone number is greater than a first preset threshold, the average call duration of the phone number is greater than a third preset threshold, and the quantity of the terminal identifying the phone number is greater than a second preset threshold. A combination of two manners is merely used as an example for description, and another combination manner is not described in detail herein.

In the foregoing three manners, to improve accuracy of nuisance phone number identification, the second preset threshold is set. The second preset threshold may be 100 thousand to 300 thousand. This is not specifically limited in this embodiment of the present invention.

203: Store the phone number and the number identification information to a nuisance phone number database when the phone number is a nuisance phone number.

The nuisance phone number database includes multiple nuisance phone numbers and corresponding number identification information that are collected by the specified server. The nuisance phone numbers may be nuisance phone numbers of different types such as a real estate agent, a fraud call, advertising and merchandising, and finance and insurance. The number identification information is used for indicating a number type of the phone number, for example, the estate agent, the fraud call, the advertising and merchandising, and the finance and insurance. The number identification information may be customized by a user providing the nuisance phone number, or may be set by the specified server according to a collected report or the like.

Steps 201 to 203 are a process of collecting nuisance phone numbers on the specified server side to form a nuisance phone number database in this embodiment of the present invention. There is no specified time sequence relationship between the process and a subsequent communication event of a terminal. The nuisance phone number database only needs to be built before the terminal actually uses a function of processing the communication event. In a process of using the function of processing the communication event by the terminal, the specified server may continue to maintain the nuisance phone number database, such as adding a nuisance phone number or correcting a phone number. This is not limited in this embodiment of the present invention. In a maintaining process, to improve time validity of the database, if a nuisance phone number is not queried for a long period of time (for example, a first time length), and no report about the nuisance phone number is received, the nuisance phone number may be deleted from the nuisance phone number database. To avoid a case such as an inadvertent deletion, data heat grading may be performed on the nuisance phone number database. For example, the nuisance phone number database may be divided into a first heat nuisance phone number database and a second heat nuisance phone number database. If the nuisance phone number is not queried for the first time length, and no report about the nuisance phone number is received, the nuisance phone number is stored to the second heat nuisance phone number database with relatively low heat. Further, if the nuisance phone number is still not queried for a period of time (for example, a second time length) and no report about the nuisance phone number is received, the nuisance phone number is deleted from the second heat nuisance phone number database. The data heat may refer to data access heat, such as being queried for or modified.

204: A terminal receives a communication event of an unknown phone number.

The communication event may refer to an incoming call event, an SMS message event, or the like. This is not limited in this embodiment of the present invention. The unknown phone number refers to any phone number not stored at the terminal. The "not stored" may refer to not being stored in a local contact list of the terminal, or not being stored in a cloud contact list of the terminal, or not being stored in a blacklist set by the terminal, the blacklist including a phone number, set by a user, that needs to be blocked. Specifically, when receiving a communication event, the terminal obtains a phone number corresponding to the communication event, and queries a contact list and a blacklist of the terminal according to the phone number. When the contact list and the blacklist of the terminal do not store the phone number, it is determined that the phone number is an unknown phone number, and the communication event is a communication event from the unknown phone number.

205: The terminal sends the unknown phone number to the specified server.

206: The specified server determines whether the nuisance phone number database includes the unknown phone number, and if the nuisance phone number database includes the unknown phone number, sends a blocking instruction to the terminal initiating a query, so that the terminal initiating the query blocks the communication event of the phone number.

When receiving the query request, the specified server queries, according to the unknown phone number, the nuisance phone number database maintained by the specified server, obtains number identification information corresponding to the unknown phone number if the nuisance phone number database includes the unknown phone number, and sends a blocking instruction including the number identification information to the terminal.

207: The terminal receives the blocking instruction, and processes the communication event according to the blocking instruction.

When receiving the blocking instruction, the terminal may directly block the communication event, so that the communication event may end without manual intervention.

It should be noted that steps 204 to 207 are a process of obtaining number identification information of the unknown phone number from the nuisance phone number database maintained by the specified server by means of interaction between the terminal and the specified server. In another embodiment provided in the embodiments of the present invention, the terminal may download and locally store, in advance, the nuisance phone number database maintained by the specified server, so that the process of obtaining the number identification information of the unknown phone number is locally implemented. Specifically, steps 204 to 207 may be replaced with the following steps: querying a locally-preset nuisance phone number database according to the unknown phone number, to obtain number identification information of the unknown phone number. The downloading of the nuisance phone number database may be automatically performed when the terminal registers a harassment blocking service, or may be manually triggered by a terminal user. After the nuisance phone number database is downloaded and stored, the specified server may be queried, at every preset time interval, for whether the database is updated. If it is determined that data of the nuisance phone number database maintained by the specified server is updated, the updated data is downloaded, and the locally-stored nuisance phone number database at the terminal is updated according to the updated data. Optionally, the updating process may be overall updating or incremental updating. This is not specifically limited in this embodiment of the present invention.

Certainly, the terminal may also first extract the number identification information carried in the blocking instruction, and perform different processing on the communication event according to different number identification information. Specifically, for further describing the processing process, it may be divided into any one of the following cases:

First case: When a number type in the number identification information of the unknown phone number is a first blocking type, blocking processing is performed on the communication event, the first blocking type being any locally-preset blocking type.

A terminal user may locally preset a type that the user intends to block. For example, the terminal may provide a blocking setting page, and the blocking setting page includes multiple blocking types provided by the specified server. The terminal user may select at least one blocking type from the blocking types as the first blocking type. Alternatively, the terminal user may also enter a customized blocking type on the blocking setting page as the first blocking type, so that blocking of the terminal can better meet needs of the user, and have higher degrees of pertinence and personalization.

Specifically, in the first case, when receiving the number identification information of the unknown phone number, the terminal may match the number type in the number identification information with the locally-preset blocking type, and when the number type matches any local blocking type, performs blocking processing on the communication event. It should be noted that the matching may refer to complete matching of characters or partial matching of the characters. This is not specifically limited in this embodiment of the present invention.

For example, the terminal user may set "advertising" on the blocking setting page as a type that the user intends to block. In this case, if the number type in the number identification information of the unknown phone number is "advertising" or "advertising and merchandising", it may be determined that the number type is the first blocking type, and blocking processing is performed on the communication event.

Second case: When a number type in the number identification information of the unknown phone number is any blocking type, blocking processing is performed on the communication event.

A terminal user may also perform blocking according to recommendation of the specified server, that is, the terminal considers that the phone number is a nuisance phone number as long as the phone number is a phone number identified by the specified server, and blocks a communication event related to the phone number.

For example, the terminal user may enable an automatic blocking function, and perform blocking processing is performed on the communication event by relying on intelligent background analysis, so that learning costs of the user is greatly saved, and blocking efficiency is improved. The intelligent background analysis may refer to real-time or offline analysis performed by the specified server according to the unknown phone number, for example, analyzing a probability that the unknown phone number is a nuisance phone number according to a forming regularity, a phone number segment, or the like of the unknown phone number. The probability may be presented by using a numerical value, and provided to the terminal user, so that the terminal user selectively processes the communication event according to the result of the intelligent background analysis, thereby providing some reference for a service such as call answering of the terminal user.

For the first case and the second case, one case may be considered as blocking according to classification set by a user, and the other case may be considered as entire blocking. The two different types of blocking may be performed according to setting of the user, and a specific setting process is not limited thereto.

Third case: When a quantity of identification times in the number identification information of the unknown phone number is greater than or equal to a locally-preset quantity of blocking identification times, blocking processing is performed on the communication event.

The number identification information may further carry the quantity of identification times, and the quantity of identification times may indicate how many users identify the phone number. It may be considered that a larger quantity of identification times indicates a higher possibility that the phone number is a nuisance phone number. Therefore, a terminal user may set a quantity of blocking identification times. When receiving the number identification information, the terminal user compares the quantity of identification times in the number identification information with the locally-preset quantity of blocking identification times, and if the quantity of identification times in the number identification information of the unknown phone number is greater than or equal to the locally-preset quantity of blocking identification times, performs blocking processing on the communication event.

For example, the locally-preset quantity of blocking identification times is 10 times, and when the quantity of identification times is greater than 10, blocking processing is performed on the communication event.

Certainly, if the terminal user learns that a phone number is not a nuisance phone number via another approach, the terminal user may also perform error correction on the phone number. The error-correction process may be: sending the phone number and error-correction information to the specified server, and correcting, by an administrator of the specified server, the number identification information after verification, so as to improve accuracy of subsequent blocking. Certainly, it may be unnecessary for an administrator to get involved in the error-correction process. When a quantity of error corrections for a phone number reaches a threshold, if users sending error-correction information are all legal users, the specified server may correct the phone number.

For some phone numbers not stored in the nuisance phone number database, the terminal may further collect feedback of users, that is, the method may further include the following steps:

Step one: If blocking processing is not performed on the communication event, the terminal displays identification reminding information, the identification reminding information being used for reminding a user to identify the unknown phone number.

The identification reminding information may be in an input box form, or may be in another form, and details are not described herein. In addition, some number identification information preset by the specified server may further be provided during display for the user to select. Certainly, the user may also custom number identification information of a current incoming call.

Step two: The terminal receives number identification information of the unknown number, and uploads the number identification information to the specified server; the specified server updates the nuisance phone number database of the specified server according to the reported phone number and the number identification information.

After the user determines the number identification information of the unknown phone number in a manner such as input or selection, the terminal receives the determined number identification information, and uploads the unknown phone number and the number identification information to the specified server. The specified server may update the nuisance phone number database according to the received phone number and the number identification information, for example, adding the currently received phone number and the number identification information to the nuisance phone number database. Certainly, for a phone number already successfully blocked by the terminal, the terminal may also upload blocking success information to the specified server, so that the specified server may evaluate a blocking effect in real time.

Figure 3:
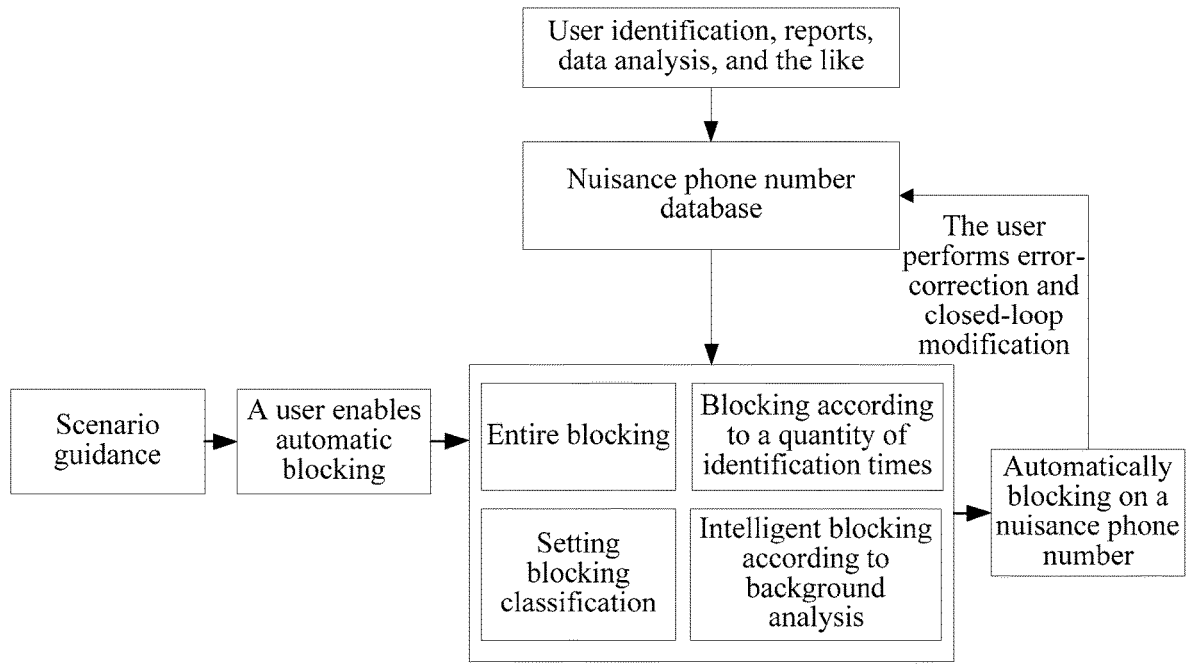
FIG. 3 is a schematic flowchart of a communication event processing process according to an embodiment of the present invention.

For deepening understanding of a blocking process and switching between different blocking manners, refer to FIG. 3. FIG. 3 is a schematic flowchart of a communication event processing process according to an embodiment of the present invention. In FIG. 3, when a terminal user enables a call function or installs a blocking function application, the terminal user may be prompted to enable automatic blocking, so as to continue to guide the terminal user to set a blocking mode, such as entire blocking, setting blocking classification, blocking according to a quantity of identification times, or intelligent blocking according to background analysis. When a communication event is received, automatic blocking may be performed based on the foregoing setting and the nuisance phone number database provided by the specified server. The terminal user may further perform error correction and modification according to self-experience after the blocking occurs, or may identify or report a phone number, or the like. The specified server performs services such as identification and data analysis, so that effective and automatic blocking on an unknown nuisance phone number is implemented, thereby greatly improving blocking efficiency, reducing call harassment, and improving security of user information and property.

In another embodiment, if blocking processing is performed on the communication event, blocking success information is displayed, the blocking success information including the number identification information. The blocking success information may be information such as "The fraud call has been successfully blocked for you", so that a user can know a blocking effect in time, thereby enhancing recognition of the user for the blocking service. It should be noted that the blocking success information may be in a top-icon form or a notification box form. This is not limited in this embodiment of the present invention.

According to the method provided in this embodiment of the present invention, a server collects identification information and call description information of terminals about phone numbers, so that the server can determine which phone numbers are nuisance phone numbers according to specific identification cases and the call description information, and can therefore provide highly accurate processing in response to a query request of a terminal, thereby greatly improving efficiency of communication event processing. Further, when receiving a communication event of an unknown phone number not stored at the terminal, the terminal queries a nuisance phone number database that is maintained by the specified server by using a method such as collection, to determine whether the unknown phone number is a nuisance phone number. The terminal may know which type of nuisance phone number the unknown phone number is according to number identification information obtained through query, and further process the communication event of the unknown phone number, thereby greatly improving the efficiency of communication event processing. Further, blocking efficiency may be effectively improved by providing multiple different blocking manners and functions such as error correction.

Figure 4:
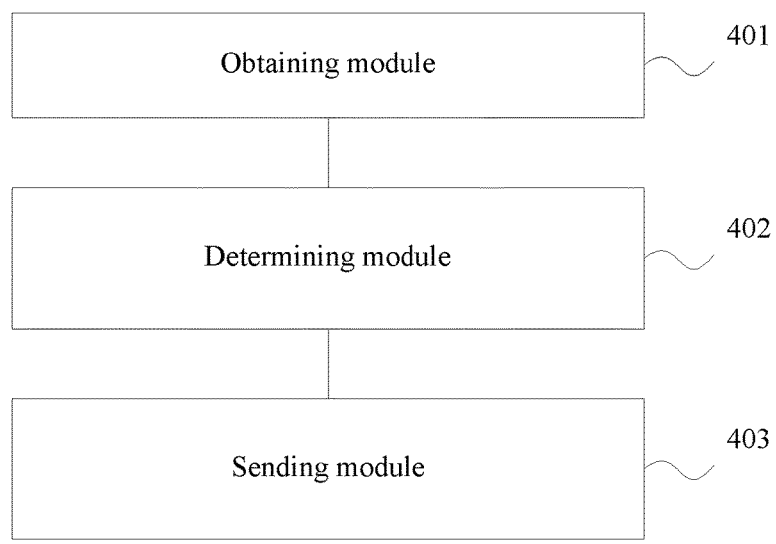
FIG. 4 is a schematic structural diagram of a communication event processing apparatus according to an embodiment of the present invention.

FIG. 4 is a schematic structural diagram of a communication event processing apparatus according to an embodiment of the present invention. Referring to FIG. 4, the apparatus includes:

an obtaining module 401, configured to obtain identification information and call description information from multiple different terminals about a phone number;

a determining module 402, configured to determine whether the phone number is a nuisance phone number according to the call description information and a quantity of the terminals identifying the phone number; and a sending module 403, configured to send, after receiving a query request for the phone number, a blocking instruction to a terminal initiating the query if the determining module determines that the phone number is a nuisance phone number, so that the terminal initiating the query blocks a communication event of the phone number.

Optionally, the determining module 402 is configured to: determine a call frequency of the phone number according to call occurring times between the multiple terminals and the phone number, and determine that the phone number is a nuisance phone number when the call frequency of the phone number is greater than a first preset threshold, and the quantity of the terminals identifying the phone number is greater than a second preset threshold.

Optionally, the determining module 402 is configured to: determine an average call duration of the phone number according to call durations between the multiple terminals and the phone number, and determine that the phone number is a nuisance phone number if the average call duration of the phone number is greater than a third preset threshold, and the quantity of the terminals identifying the phone number is greater than a second preset threshold.

Optionally, the determining module 402 is configured to: determine a call-occurring-region overlapping rate of the phone number according to call occurring regions between the multiple terminals and the phone number, and determine that the phone number is a nuisance phone number when the call-occurring-region overlapping rate of the phone number is greater than a fourth preset threshold, and the quantity of the terminals identifying the phone number is greater than a second preset threshold.

Optionally, the obtaining module 401 is configured to: extract the identification information and the call description information from the multiple different terminals about the phone number from user report information of a specified application; and/or extract the identification information and the call description information from the multiple different terminals about the phone number from user report information of an application except the specified application; and/or extract the identification information and the call description information from the multiple different terminals about the phone number from comment information of network users by using a web crawler.

Figure 5:
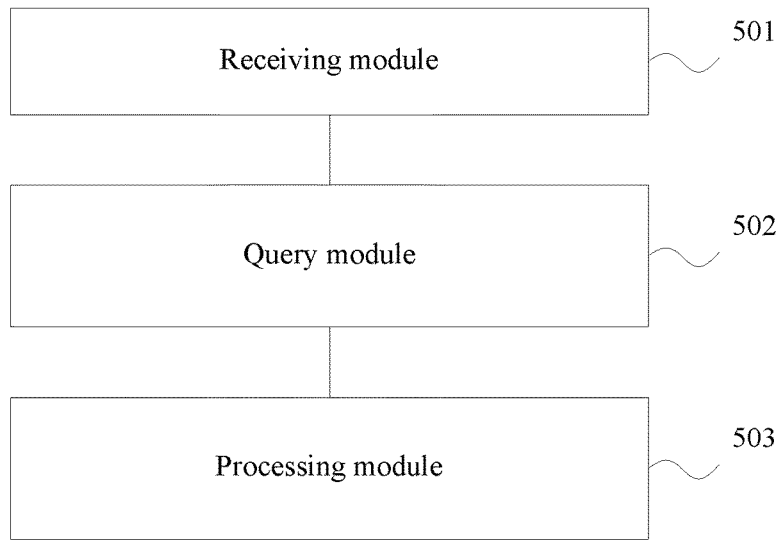
FIG. 5 is a schematic structural diagram of a communication event processing apparatus according to an embodiment of the present invention.

FIG. 5 is a schematic structural diagram of a communication event processing apparatus according to an embodiment of the present invention. Referring to FIG. 5, the apparatus includes:

a receiving module 501, configured to receive a communication event of an unknown phone number;

a query module 502, configured to query a preset nuisance phone number database according to the unknown phone number, to obtain number identification information of the unknown phone number, the nuisance phone number database including multiple nuisance phone numbers and corresponding number identification information that are collected by a specified server; and a processing module 503, configured to process the communication event according to the number identification information of the unknown phone number.

Optionally, the query module 502 is configured to query a locally-preset nuisance phone number database according to the unknown phone number, to obtain the number identification information of the unknown phone number; or the query module 502 is configured to: send the unknown phone number to the specified server, and receive the number identification information obtained by the specified server by querying, according to the unknown phone number, a nuisance phone number database maintained by the specified server.

Optionally, the processing module 503 is configured to perform blocking processing on the communication event when a number type in the number identification information of the unknown phone number is a first blocking type, the first blocking type being any locally-preset blocking type; or the processing module 503 is configured to perform blocking processing on the communication event when a number type in the number identification information of the unknown phone number is any blocking type; or the processing module 503 is configured to perform blocking processing on the communication event when a quantity of identification times in the number identification information of the unknown phone number is greater than or equal to a locally-preset quantity of blocking identification times.

Optionally, the apparatus further includes: a display module, where the display module is configured to display blocking success information if blocking processing is performed on the communication event, the blocking success information including the number identification information; or the display module is configured to display identification reminding information if blocking processing is not performed on the communication event, the identification reminding information being used for reminding a user to identify the unknown phone number.

Optionally, the receiving module 501 is further configured to receive the number identification information of the unknown phone number.

The apparatus further includes:

a sending module, configured to upload the number identification information to the specified server, so that the specified server updates the nuisance phone number database of the specified server according to the reported phone number and the number identification information.

It should be noted that division of the above functional modules are only described as an example when the communication event processing apparatus provided in the foregoing embodiments processes a communication event. In actual applications, the functions may be allocated according to needs to be implemented by different functional modules, that is, the internal structure of the apparatus is divided into different functional modules to complete all or some of the above described functions. In addition, the communication event processing apparatus provided in the foregoing embodiments is based on the same concept as the communication event processing method in the foregoing embodiments. For the specific implementation process, refer to the method embodiments, and the details are not described herein again.

Figure 6:
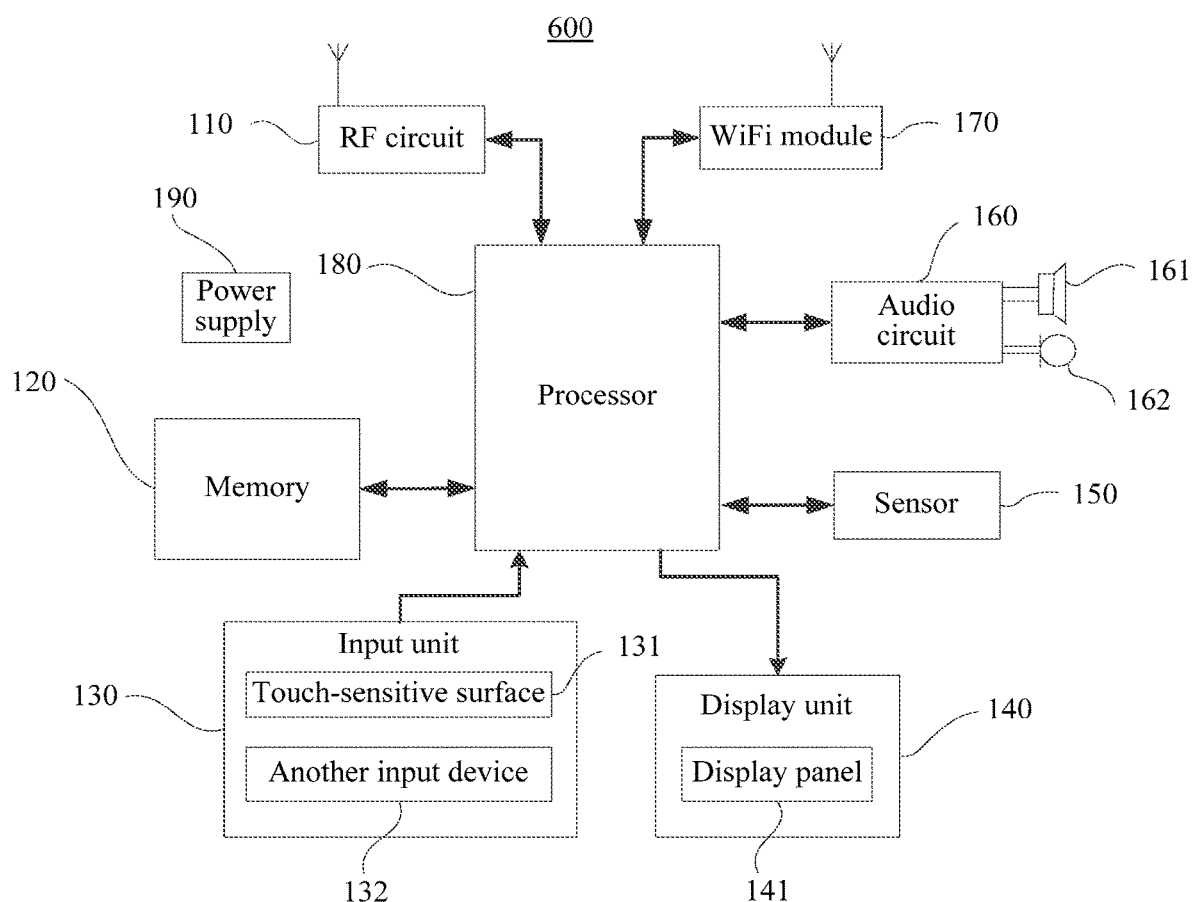
FIG. 6 is a schematic structural diagram of a terminal according to an embodiment of the present invention.

An embodiment provides a terminal, and the terminal may be configured to execute the communication event processing method provided in the foregoing embodiments. Referring to FIG. 6, the terminal 600 includes:

The terminal 600 may include components such as an RF (Radio Frequency) circuit 110, a memory 120 including one or more computer readable storage media, an input unit 130, a display unit 140, a sensor 150, an audio circuit 160, a WiFi (Wireless Fidelity) module 170, a processor 180 including one or more processing cores, and a power supply 190. A person skilled in the art may understand that the structure of the terminal shown in FIG. 6 does not constitute a limitation to the terminal, and the terminal may include more or fewer components than those shown in the figure, or combine some components, or use a different component deployment.

The RF circuit 110 may be configured to receive and send signals in an information receiving and sending process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, an LNA (Low Noise Amplifier), and a duplexer. In addition, the RF circuit 110 may also communicate with a network and another device by means of wireless communication. The wireless communication may use any communications standard or protocol, which includes, but is not limited to, GSM (Global System for Mobile communications), GPRS (General Packet Radio Service), CDMA (Code Division Multiple Access), WCDMA (Wideband Code Division Multiple Access), LTE (Long Term Evolution), e-mail, and SMS (Short Messaging Service).

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 600, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical or track ball signal input related to the user setting and function control. Specifically, the input unit 130 may include a touch-sensitive surface 131 and another input device 132. The touch-sensitive surface 131, which may also be referred to as a touch display screen or a touch control board, may collect a touch operation of a user on or near the touch-sensitive surface (such as an operation of a user on or near the touch-sensitive surface 131 by using any suitable object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using a type such as a resistive, capacitive, infrared, or surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 600, and these graphical user interfaces may be constituted by an image, a text, an icon, a video, and any combination of them. The display unit 140 may include a display panel 141. Optionally, the display panel 141 may be configured by using an LCD (Liquid Crystal Display), an OLED (Organic Light-Emitting Diode), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 6, the touch-sensitive surface 131 and the display panel 141 are used as two separate parts to implement input and output functions, in some embodiments, the touch-sensitive surface 131 and the display panel 141 may be integrated to implement the input and output functions.

The terminal 600 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 600 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal 600, are not further described herein.

The audio circuit 160, a loudspeaker 161, and a microphone 162 may provide audio interfaces between the user and the terminal 600. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 600.

WiFi is a short distance wireless transmission technology. The terminal 600 may help, by using the WiFi module 170, the user receive and send e-mails, browse a webpage, access streaming media, and so on, which provides wireless broadband Internet access for the user. Although FIG. 6 shows the WiFi module 170, it may be understood that the WiFi module is not a necessary component of the terminal 600, and when required, may be omitted as long as the scope of the essence of the present disclosure is not changed.

The processor 180 is the control center of the terminal 600, and is connected to various parts of the mobile phone by using various interfaces and lines. By running or executing the software program and/or module stored in the memory 120, and invoking data stored in the memory 120, the processor 180 performs various functions and data processing of the terminal 600, thereby performing overall monitoring on the mobile phone. Optionally, the processor 180 may include the one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 600 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include any component such as one or more direct-current or alternating current power supplies, a recharge system, a power-supply failure detection circuit, a power-supply converter, an inverter, a power state indicator.

Although not shown in the figure, the terminal 600 may further include a camera, a Bluetooth module, and the like, which are not further described herein. Specifically, in this embodiment, the display unit of the terminal is a touchscreen display, and the terminal further includes a memory and one or more programs. The one or more programs are stored in the memory and configured to be executed by one or more processors. The one or more programs contain instructions for performing the operations on the terminal side in the embodiment shown in FIG. 2.

In an exemplary embodiment, a non-transitory computer readable storage medium including instructions is further provided, for example, a memory including instructions, and the foregoing instructions may be executed by the processor in the terminal to complete the steps on the terminal side of the communication event processing method shown in the embodiment in FIG. 2. For example, the non-transitory computer readable storage medium may be a ROM, a random access memory (RAM), a CD-ROM, a tape, a floppy disk, or an optical data storage device.

Figure 7:
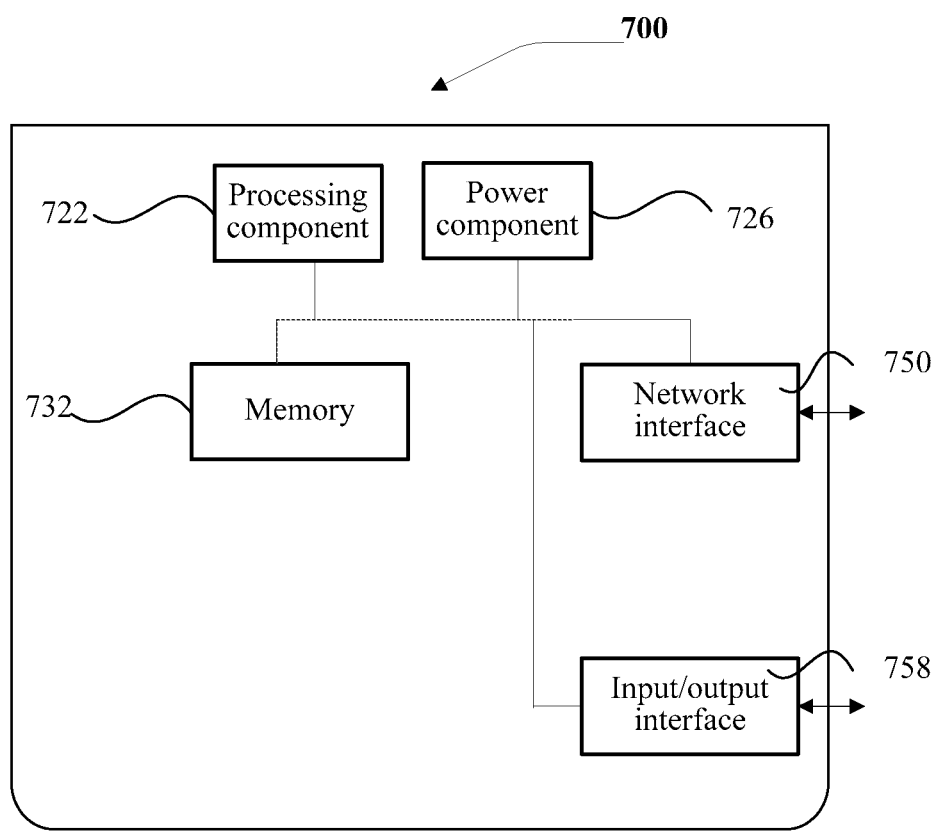
FIG. 7 is a schematic structural diagram of an apparatus for communication event processing according to an embodiment of the present invention.

FIG. 7 is a block diagram of an apparatus 700 for communication event processing according to an exemplary embodiment. For example, the apparatus 700 may be provided as a server. Referring to FIG. 7, the apparatus 700 includes a processing component 722, and further includes one or more processors, and storage resources represented by a memory 732 for storing instructions, for example, an application program, that may be executed by the processing component 722. The application program stored in the memory 732 may include one or more modules, each of which corresponds to a group of instructions. In addition, the processing component 722 is configured to execute the instructions, so as to execute the communication event processing method.

The apparatus 700 may further include a power component 726 configured to perform power management of the apparatus 700, a wired or wireless network interface 750 configured to connect the apparatus 700 to a network, and an input/output (I/O) interface 758. The apparatus 700 may operate an operating system, for example, Windows Server™, Mac OS X™, Unix™, Linux™, or FreeBSD™, that is stored in the memory 732.

In an exemplary embodiment, a non-transitory computer readable storage medium including instructions is further provided, for example, a memory including instructions, and the foregoing instructions may be executed by a processor in a server to complete the steps on the server side of the communication event processing method shown in the embodiment in FIG. 2. For example, the non-transitory computer readable storage medium may be a ROM, a random access memory (RAM), a CD-ROM, a tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present invention, and is not intended to limit the present disclosure. Any modifications, equivalent variations, and improvements made in accordance with the spirits and principles of the present disclosure shall fall within the protection scope of the present disclosure.

What is claimed is:

1. A communication event processing method performed at a computer system including a computer server and a terminal that is communicatively connected to the computer server, the method comprising:
   at the computer server:
   obtaining identification information and call description information from multiple different terminals about a phone number;
   receiving a nuisance-checking query for the phone number initiated by the terminal after the terminal receives a communication event associated with the phone number for the first time;

in response to the nuisance-checking query, determining whether the phone number is a nuisance phone number according to: (i) the call description information, and (ii) a quantity of the terminals identifying the phone number as a nuisance phone number;

in accordance with a determination that the phone number is a nuisance phone number, counting a quantity of identification times that specifies a number of users who have identified the phone number as a nuisance phone number, wherein counting the quantity of identification times further comprises:

in accordance with determining that a single user has identified the same phone number as a nuisance phone number for a plurality of times, counting, by the server, the quantity of identification times associated with the single user as one;

sending a blocking instruction to the terminal initiating the nuisance-checking query, wherein the blocking instruction includes the quantity of identification times indicating the number of users who have identified the phone number as a nuisance phone number and number identification information for indicating a nuisance type of the nuisance phone number, and at the terminal:

presetting, by a user of the terminal, a customized threshold quantity of identification times for any phone number to be automatically blocked by the terminal, the customized threshold quantity of identification times for a phone number indicates a maximum number of users who have identified the phone number as a nuisance phone number before the phone number is automatically blocked by the terminal;

after presetting the customized threshold quantity, receiving the blocking instruction from the computer server;

comparing the quantity of identification times associated with the phone number with the customized threshold quantity of identification times that is preset by the user of the terminal;

in accordance with the comparison result obtained at the terminal indicating that the quantity of identification times associated with the phone number is greater than the customized threshold quantity of identification times customized by the user, blocking the communication event associated with the phone number without any further user instruction; and generating blocking success information in a notification box of the terminal, wherein the blocking success information includes a message characterizing the nuisance type of the phone number according to the corresponding number identification information.

2. The method according to claim 1, wherein the operation of determining whether the phone number is a nuisance phone number according to the call description information and the quantity of the terminals identifying the phone number comprises:

determining a call frequency of the phone number according to call occurring times between the multiple terminals and the phone number; and determining that the phone number is a nuisance phone number when the call frequency of the phone number is greater than a first preset threshold, and the quantity of the terminals identifying the phone number is greater than a second preset threshold.

3. The method according to claim 1, wherein the operation of determining whether the phone number is a nuisance phone number according to the call description information and the quantity of the terminals identifying the phone number comprises:

determining an average call duration of the phone number according to call durations between the multiple terminals and the phone number; and determining that the phone number is a nuisance phone number if the average call duration of the phone number is greater than a third preset threshold, and the quantity of the terminals identifying the phone number is greater than a second preset threshold.

4. The method according to claim 1, wherein the operation of determining whether the phone number is a nuisance phone number according to the call description information and the quantity of the terminals identifying the phone number further comprises:

determining a call-occurring-region overlapping rate of the phone number according to call occurring regions between the multiple terminals and the phone number; and determining that the phone number is a nuisance phone number when the call-occurring-region overlapping rate of the phone number is greater than a fourth preset threshold, and the quantity of the terminals identifying the phone number is greater than a second preset threshold.

5. The method according to claim 1, wherein the operation of obtaining identification information and call description information from multiple different terminals about a phone number comprises:

extracting the identification information and the call description information from the multiple different terminals about the phone number from user report information of a specified application;

extracting the identification information and the call description information from the multiple different terminals about the phone number from user report information of an application except the specified application; and extracting the identification information and the call description information from the multiple different terminals about the phone number from comment information of network users by using a web crawler.

6. A computer system, comprising:

a computer server; and a terminal that is communicatively connected to the computer server;

wherein the computer server is configured to perform the following operations:

obtaining identification information and call description information from multiple different terminals about a phone number;

receiving a nuisance-checking query for the phone number initiated by the terminal after the terminal receives a communication event associated with the phone number for the first time;

in response to the nuisance-checking query, determining whether the phone number is a nuisance phone number according to: (i) the call description information, and (ii) a quantity of the terminals identifying the phone number as a nuisance phone number;

in accordance with a determination that the phone number is a nuisance phone number, counting a quantity of identification times that specifies a number of users who have identified the phone number as a nuisance phone number, wherein counting the quantity of identification times further comprises:

in accordance with determining that a single user has identified the same phone number as a nuisance phone number for a plurality of times, counting, by the server, the quantity of identification times associated with the single user as one;

sending a blocking instruction to the terminal initiating the nuisance-checking query, wherein the blocking instruction includes the quantity of identification times indicating the number of users who have identified the phone number as a nuisance phone number and number identification information for indicating a nuisance type of the nuisance phone number, wherein the terminal is configured to perform the following operations:

presetting, by a user of the terminal, a customized threshold quantity of identification times for any phone number to be automatically blocked by the terminal, the customized threshold quantity of identification times for a phone number indicates a maximum number of users who have identified the phone number as a nuisance phone number before the phone number is automatically blocked by the terminal;

after presetting the customized threshold quantity, receiving the blocking instruction from the computer server;

comparing the quantity of identification times associated with the phone number with the customized threshold quantity of identification times that is preset by the user of the terminal;

in accordance with the comparison result obtained at the terminal indicating that the quantity of identification times associated with the phone number is greater than the customized threshold quantity of identification times customized by the user, blocking the communication event associated with the phone number without any further user instruction; and generating blocking success information in a notification box of the terminal, wherein the blocking success information includes a message characterizing the nuisance type of the phone number according to the corresponding number identification information.

7. The computer system according to claim 6, wherein the computer server is further configured to: determine a call frequency of the phone number according to call occurring times between the multiple terminals and the phone number, and determine that the phone number is a nuisance phone number when the call frequency of the phone number is greater than a first preset threshold, and the quantity of the terminals identifying the phone number is greater than a second preset threshold.

8. The computer system according to claim 6, wherein the computer server is further configured to: determine an average call duration of the phone number according to call durations between the multiple terminals and the phone number, and determine that the phone number is a nuisance phone number if the average call duration of the phone number is greater than a third preset threshold, and the quantity of the terminals identifying the phone number is greater than a second preset threshold.

9. The computer system according to claim 6, wherein the computer server is further configured to: determine a call-occurring-region overlapping rate of the phone number according to call occurring regions between the multiple terminals and the phone number, and determine that the phone number is a nuisance phone number when the call-occurring-region overlapping rate of the phone number is greater than a fourth preset threshold, and the quantity of the terminals identifying the phone number is greater than a second preset threshold.

10. The computer system according to claim 6, wherein the computer server is further configured to: extract the identification information and the call description information from the multiple different terminals about the phone number from user report information of a specified application; and/or extract the identification information and the call description information from the multiple different terminals about the phone number from user report information of an application except the specified application; and/or extract the identification information and the call description information from the multiple different terminals about the phone number from comment information of network users by using a web crawler.

11. A non-transitory computer-readable storage medium, storing one or more programs configured for execution by one or more processors of a terminal, the one or more programs including instructions for causing the terminal to:

preset a customized threshold quantity of identification times for any phone number to be automatically blocked by the terminal, the customized threshold quantity of identification times for a phone number indicates a maximum number of users who have identified the phone number as a nuisance phone number before the phone number is automatically blocked by the terminal;

receive a communication event associated with a phone number for the first time;

in response to receiving the communication event, send a nuisance-checking query for the phone number to a remote server, wherein the remote server is configured to:

obtain identification information and call description information from multiple different terminals about the phone number;

receive a nuisance-checking query for the phone number initiated by the terminal after the terminal receives a communication event associated with the phone number for the first time;

in response to the nuisance-checking query, determine whether the phone number is a nuisance phone number according to: (i) the call description information, and (ii) a quantity of the terminals identifying the phone number as a nuisance phone number;

in accordance with a determination that the phone number is a nuisance phone number, count a quantity of identification times that specifies a number of users who have identified the phone number as a nuisance phone number, wherein counting the quantity of identification times further comprises:

in accordance with determining that a single user has identified the same phone number as a nuisance phone number for a plurality of times, counting, by the server, the quantity of identification times associated with the single user as one;

send a blocking instruction to the terminal initiating the nuisance-checking query, wherein the blocking instruction includes the quantity of identification times indicating the number of users who have identified the phone number as a nuisance phone number and number identification information for indicating a nuisance type of the nuisance phone number, and receive a blocking instruction from the computer server;

in response to receiving the blocking instruction, compare the quantity of identification times associated with the phone number with the customized threshold quantity of identification times that is preset by the user of the terminal;

in accordance with the comparison result obtained at the terminal indicating that the quantity of identification times associated with the phone number is greater than the customized threshold quantity of identification times customized by the user, block the communication event associated with the phone number without any further user instruction; and generate blocking success information in a notification box of the terminal, wherein the blocking success information includes a message characterizing the nuisance type of the phone number according to the corresponding number identification information.

12. The non-transitory computer readable storage medium according to claim 11, wherein the computer server is further configured to: determine a call frequency of the phone number according to call occurring times between the multiple terminals and the phone number, and determine that the phone number is a nuisance phone number when the call frequency of the phone number is greater than a first preset threshold, and the quantity of the terminals identifying the phone number is greater than a second preset threshold.

13. The non-transitory computer readable storage medium according to claim 11, wherein the computer server is further configured to: determine an average call duration of the phone number according to call durations between the multiple terminals and the phone number, and determine that the phone number is a nuisance phone number if the average call duration of the phone number is greater than a third preset threshold, and the quantity of the terminals identifying the phone number is greater than a second preset threshold.

14. The non-transitory computer readable storage medium according to claim 11, wherein the computer server is further configured to: determine a call-occurring-region overlapping rate of the phone number according to call occurring regions between the multiple terminals and the phone number, and determine that the phone number is a nuisance phone number when the call-occurring-region overlapping rate of the phone number is greater than a fourth preset threshold, and the quantity of the terminals identifying the phone number is greater than a second preset threshold.

15. The non-transitory computer readable storage medium according to claim 11, wherein the computer server is further configured to: extract the identification information and the call description information from the multiple different terminals about the phone number from user report information of a specified application; and/or extract the identification information and the call description information from the multiple different terminals about the phone number from user report information of an application except the specified application; and/or extract the identification information and the call description information from the multiple different terminals about the phone number from comment information of network users by using a web crawler.

* * * * *